United States Patent
Borean et al.

(10) Patent No.: US 7,748,363 B2
(45) Date of Patent: Jul. 6, 2010

(54) MULTI-CYLINDER INTERNAL COMBUSTION ENGINE WITH INDEPENDENT CYLINDERS

(75) Inventors: Fabio Borean, Orbassano (IT); Pasquale Ceres, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 12/330,925

(22) Filed: Dec. 9, 2008

(65) Prior Publication Data

US 2009/0150054 A1 Jun. 11, 2009

Related U.S. Application Data

(63) Continuation-in-part of application No. 12/326,351, filed on Dec. 2, 2008.

(30) Foreign Application Priority Data

Dec. 4, 2007 (EP) .................. 07425773

(51) Int. Cl.
*F02M 1/00* (2006.01)
*F01L 9/04* (2006.01)

(52) U.S. Cl. .................. 123/434; 123/90.11; 123/322; 123/347

(58) Field of Classification Search .............. 123/432, 123/198 F, 90.12, 90.15, 90.16, 90.31, 90.48, 123/90.55, 434, 322

See application file for complete search history.

(56) References Cited

U.S. PATENT DOCUMENTS

| 6,732,710 B2 * | 5/2004 | Borean et al. .............. 123/432 |
| 6,736,092 B2 * | 5/2004 | Borean et al. ............ 123/90.12 |
| 7,359,791 B2 * | 4/2008 | Borean et al. .............. 701/103 |
| 2001/0023679 A1 | 9/2001 | Ganser et al. |

FOREIGN PATENT DOCUMENTS

| DE | 100 01 062 | 10/2001 |
| DE | 101 06 169 | 8/2002 |
| EP | 0 931 912 | 7/1999 |
| WO | 02/073020 | 9/2002 |

* cited by examiner

*Primary Examiner*—John T Kwon
(74) *Attorney, Agent, or Firm*—Nixon & Vanderhye P.C.

(57) ABSTRACT

Internal combustion engine with variable actuation of the valves providing electronic control means which, when the engine is subject to an operating variation request from a first operating condition to a second operating condition, are adapted to select a cylinder to which to assign said second operating condition based on a determined programming delay only as a function of the engine speed.

7 Claims, 7 Drawing Sheets

MULTI-CYLINDER INTERNAL COMBUSTION ENGINE WITH INDEPENDENT CYLINDERS

This application is a continuation-in-part of application Ser. No. 12/326,351 filed 2 Dec. 2008, which claims priority to European Application No. 07425773.4, filed 4 Dec. 2007, the entire contents of both of which are hereby incorporated by reference.

BACKGROUND OF THE INVENTION

The present invention relates to multi-cylinder internal combustion engines of the type comprising:
- an air delivery pipe adapted to convey air to each engine cylinder,
- at least one intake valve for each cylinder that controls the communication between said pipe and the combustion chamber of the respective cylinder, and
    - wherein each intake valve is controlled by actuator means for making a particular quantity of air flow into said combustion chamber, said actuator means being susceptible to controlling the respective intake valve independently from the other cylinders and according to a variable actuation method,
- injector means for each cylinder adapted to carry out the injection of a determined quantity of fuel into said combustion chamber,
- electronic control means adapted to control:
    - said actuator means, for adjusting the opening time and stroke of the respective intake valve,
    - said injector means, for adjusting said determined quantity of fuel, wherein, when the engine is subject to an operating variation request from a first operating condition to a second operating condition, said electronic control means are adapted to select the cylinder to which said second operating condition is assigned based on a programming delay.

International application no. WO02/073020 offers a method, for an internal combustion engine with variable actuation of the cylinder valves, for managing the operating variations wherein, in correspondence with the request for a new torque, an actuation of the injector and the valves is performed according to intermediate modes between the old mode and the new mode, until the injector and the valves can eventually be actuated in a cylinder according to the new mode.

Therefore, said method envisages an immediate variation of the cylinder operating modes, as a result of the request for a new torque, in order to reach the new mode in the cylinders as soon as possible, but gradually.

European Patent Application no. 07425773.4 of the same Applicant describes a multi-cylinder internal combustion engine with independent cylinders wherein a control mode is envisaged for the injector and the valves whereby, as a result of a variation in the engine operating mode, the electronic control means estimate the quantity of air and fuel corresponding to the new operating mode, estimate the actuation times of the injector and the valves corresponding to the estimated quantity of air and fuel and, based on said actuation times, they assign the new operating mode to the first cylinder being able to actuate it. Particularly, based on the actuation times, the electronic control means estimate the delay, with respect to the moment when the calculation of said times is made, in order to reach top dead centre in a cylinder for the implementation of the combustion process corresponding to the operating condition of the new operating mode of the engine; said electronic control means also assign said operating condition for the first time to the cylinder which, after the moment when the calculation of said times is made, is first susceptible to finding itself in a top dead centre condition for the implementation of a combustion process after said delay has passed.

The above-indicated solution, therefore, envisages that the internal combustion engine responds to the torque variation requests, assigning the new operating conditions for the first time to a cylinder which firstly, following an engine operating variation request, is effectively able to satisfy such new operating conditions. The cylinders implementing a combustion process before the cylinder to which the new operating mode is assigned, continue to operate in the old mode.

Hence it is clear that the solution under discussion, similarly to the solution described in International Application no. WO 02/073020, following a torque variation request, does not envisage an immediate response of the engine according to the actuation of the valves and the injectors in intermediate modes; but, it checks which cylinder is first able to actuate the new operating modes in order to assign said modes to it.

The main aim of the solution proposed in European patent application no. 07425773.4 was to ensure a fast response of the engine to the operating variation request, at the same time obtaining excellent combustion process in the cylinders. In the solution of International application no. WO02/073020, the intermediate modes that are actuated in the cylinders generate combustion processes that are far from being excellent and that hence considerably reduce the performance of the engine.

However, the Applicant has recently noticed that the solution of European patent application no. 07425773.4 has some drawbacks that will become clear as follows.

FIG. 1 represents an operating diagram of an internal combustion engine as described in European patent application no. 07425773.4, in the presence of a (load or speed transient) variation of the engine conditions.

Herein, the actuation diagrams of the respective injector means and the respective intake valve are shown for both the cylinders CIL1 and CIL2, as also for the electronic control means, for an operating period identified by the time axis.

In the first operating mode of the engine both the cylinders operate in the same operating conditions characterised by the actuations indicated in the figure as INJ(0) and EV(0), respectively of the injector means and the intake valve. From FIG. 1 it can be understood that the programming delay corresponding to the first operating mode is equal to three engine strokes.

In line with the torque variation requested, the electronic means evaluate the times necessary for the actuations of the intake valve and the injector means, adapted for establishing the combustion process corresponding to such new required torque.

The electronic control means, hence, calculate the programming delay corresponding to the new operating conditions of the cylinders and based on this it evaluates to which cylinder to assign the operating condition corresponding to the new conditions.

The programming delay corresponding to the new operating condition of the example in FIG. 3 is equal to four engine strokes.

As has been schematically represented in FIG. 1, for cylinder 2 it is not possible to carry out the combustion process adapted to generate the new torque requested in correspondence with its top dead centre condition for the implementation of a combustion process. In fact, from FIG. 1, it can be understood that starting from the moment of the new torque request, only three engine strokes follow before reaching such top dead centre condition of cylinder CIL2, whilst the actuation delay of the new operating conditions is equal to four engine strokes.

The time available, starting from the moment of the new torque request, in order to reach the top dead centre condition in cylinder CIL2 for the implementation of a combustion process is, hence, insufficient to actuate in synchrony the injector means and the intake valve of that cylinder in order to establish the new operating conditions.

In other words, as schematically indicated in FIG. 1 the actuations, and specifically the actuation stage of the injector means, adapted to establish a combustion process able to generate the requested torque, should have started before the torque request time. This condition is schematically represented in FIG. 1 by the part relative to the actuation of the injector means of the cylinder CIL2 which is indicated as eliminated by a prohibition sign.

It emerges, hence, that it is in particular the necessary time for the new injection operations that determines the unsuitability of cylinder CIL2 to be the first cylinder to operate according to the new operating conditions.

Whereas, it emerges that the cylinder CIL1, on the other hand, is the first cylinder susceptible to operating according to the new operating conditions. In fact, starting from the moment of the new torque request until the top dead centre condition of the cylinder CIL1 for the implementation of a combustion process, four engine strokes follow each other, which correspond exactly to the necessary time for implementing the new operating conditions.

Following the evaluations described above, the electronic control means assign to the injector means and the actuator means of the cylinder CIL1 intake valve, the actuation modes corresponding to the new operating conditions. In FIG. 1, these new actuation modes are respectively indicated as INJ(−1) and EV(−1). The arrow represented in FIG. 1, which is laid out transversally, indicates the fact that once the electronic means have verified that the CIL2 is not susceptible to being the first cylinder to operate in the new operating conditions, they automatically assign to the actuator means and the injector means of the cylinder CIL1 such new actuation modes.

The actuation modes of the injector means and the actuator means of the intake valve of the cylinder CIL2, and hence the operating conditions of the latter, are controlled in such a way that they continue to be the same as those preceding the torque increase request. Such actuation modes are respectively indicated in brackets by INJ(OLD) and EV(OLD) and are the same as the modes INJ(0) and EV(0) previously defined.

Following the last cycle carried out by the cylinder CIL2 in the old operating conditions (with the actuation modes INJ(OLD) and EV(OLD)), the electronic means finally assign to the latter the operation with the new operating condition for which the actuation modes associated with this are the modes INV(−1) and EV(−1)).

Since the programming delay of the new operating conditions is increased by one engine stroke with respect to the previous activation delay, the electronic means start to operate the control for the implementation of the new operating conditions on the various cylinders one stroke before the stroke in which the electronic means intervened in the old operating conditions. Such intervention variation is indicated schematically in FIG. 1 using horizontal arrows, for both the cylinders CIL1 and CIL2, in line with the strokes in which they operate in the new operating conditions.

The Applicant has checked that the control strategy described above can determine situations in which the combustion process is not susceptible to being controlled in a predetermined way. The main cause is due to the complicated handling of the electronic control means, which, according to such control strategy, must continuously check in real-time the actuation delays of the valves and injector with respect to each operating mode.

For determined engine loads and speeds, such activity of the electronic control means may be inefficient. In fact, despite the control means operated to identify the very first cylinder that might operate in the new operating modes, in actual fact, it is not possible to guarantee deterministic and predictable behaviour during arbitrary manoeuvres made by the driver. Thereafter, depending on the individual case the cylinder to be actuated first in the new operating mode may be different, and the combustion process that is triggered in such first useful cylinder might be different from the best one envisaged, or may, in particular, differ from the best one in an unpredictable and uncontrollable way.

Furthermore, a considerable load increase corresponds systematically to the contemporary handling of two programmings on different cylinders, as described in FIG. 1. One of the two cylinders, particularly that being unable to actuate the new torque request (CYL2 in FIG. 1), is systematically programmed with the old reference. This behaviour, acceptable for occasional abrupt load reference variations, becomes difficult to manage if it is desired to fully exploit the possibility, offered by technology, of varying the load reference, even abruptly, systematically and with the aim of differentiating the torque delivered by each cylinder.

Furthermore, processing the above-indicated control strategy requires complex and highly performing software determining high production costs.

In view of the above-indicated drawbacks, the Applicant offers a new solution for the control of the transients of an internal combustion engine, according to the independent claims from 1 to 6.

Unlike the proposals of the above-discussed solutions, wherein control systems are envisaged that evaluate in real-time how and when to adopt the new operating conditions of the cylinders, in the various ways described above, in the present invention a programming delay is fixed a priori for each operating condition during the set-up stage of the control means, depending, exclusively on the speed values of the engine. This means that in correspondence with a particular engine speed, the programming delay associated with it is always the same, irrespective of the new conditions requested.

The fact that the programming delay is artificially defined depending only on the speeds, allows its value to be evaluated a priori at the corresponding speed and to be stored in the electronic control unit in such a way that it is always available.

The programming delay following a request determines when each operating condition must be programmed in order to be actuated in the cylinders. Therefore, according to the present invention, from the moment of the operating mode variation request the control system is able to identify, based on such a programming delay, the cylinder to which the new condition is to be assigned, and the moment in which it will be actuated for the first time in the cylinders, without having to carry out any real-time processing.

The innovative approach of the control system according to the present invention is therefore clear and, as emerges from the above, it differs from the solutions developed up to now in the approach of the solution to the problem, that is leaving a real-time control of the transients from one engine operating mode to another, providing, on the other hand, a means of handling these transients according to a simplified pattern chosen a priori.

As will be clear below, this choice allows the control system to be simplified to a large extent, above all allowing the complications of the feedback controls, that are absolutely necessary in the systems of the above-indicated art, to be abandoned.

BRIEF DESCRIPTION OF THE DRAWINGS

Further characteristics and advantages of the invention will be clear from the following description with reference to the attached drawings, provided by way of a non-limiting example, in which.

DETAILED DESCRIPTION OF THE INVENTION

The present invention refers to internal combustion engines that provide actuator means adapted to control the intake valve of each cylinder independently from the other cylinders and according to a variable actuation mode.

Figure 5:
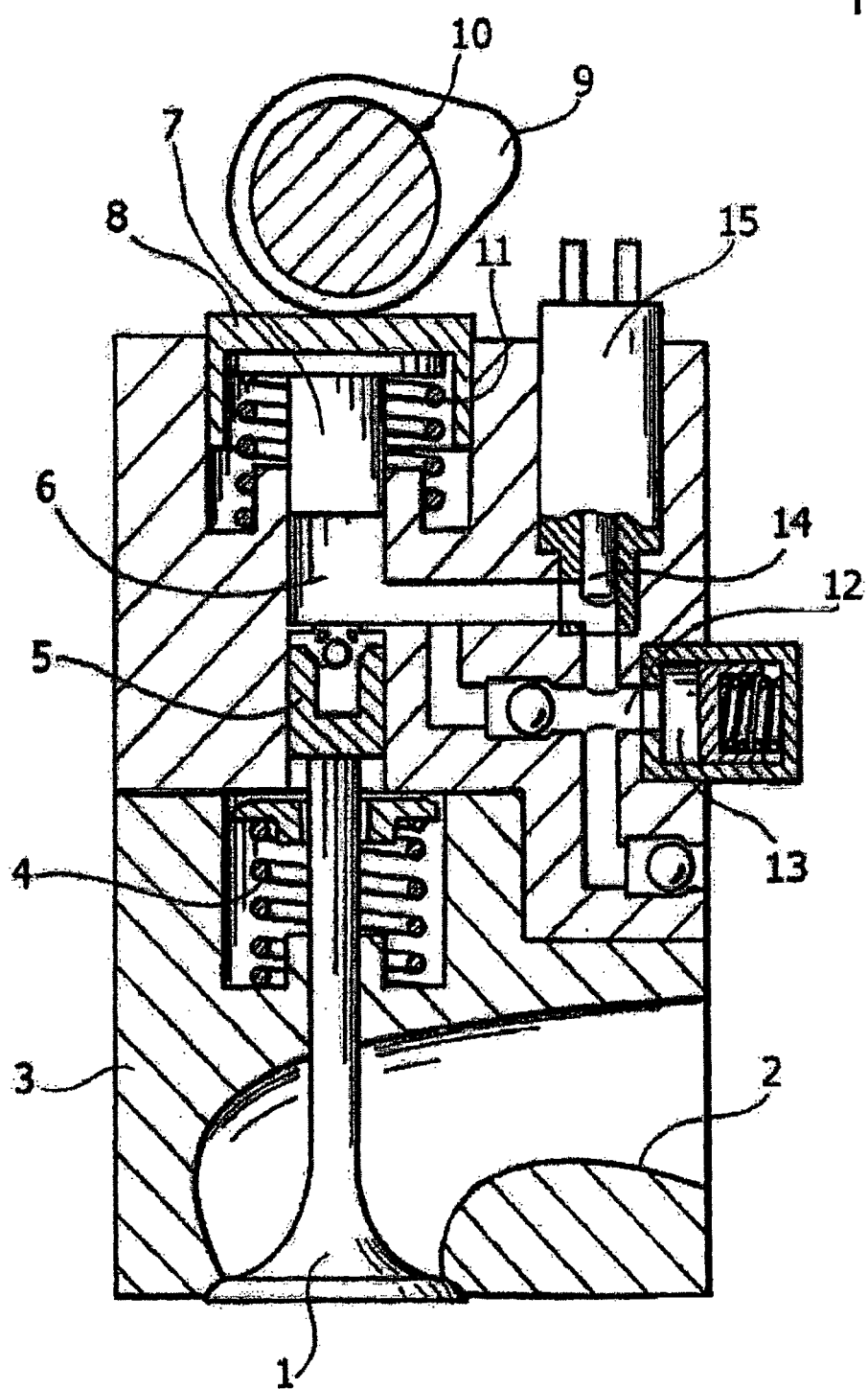
FIG. 5 is a schematic sectional view of an engine according to the known art, which illustrates the operating principle of a variable drive system of the engine valves.

An internal combustion engine of this type is, for example, represented by the internal combustion engines provided by the variable operating system of the valves, which is schematically depicted in FIG. 5, and which is the subject matter of several patents by the same Applicant.

With reference to FIG. 5, the reference numeral 1 designates the valve as a whole (which can be an intake valve or an exhaust valve) associated with a respective pipe 2 (intake or exhaust) formed in an internal combustion engine head 3. The valve 1 is returned towards its closed position (upwards with reference to FIG. 5) by a spring 4, whilst this is forced to open by a piston 5 acting on the upper end of the valve stem. The piston 5 is, in turn, controlled through the oil pressure within a chamber 6 by a piston 7 that supports a bowl 8 cooperating with a cam 9 of a camshaft 10. The bowl 8 is held by a spring 11 in sliding contact with the cam 9. The pressure chamber 6 can be connected to a pipe 12 which, in turn, communicates with a pressure accumulator 13, through the shutter 14 of a solenoid valve 15 which is controlled by electronic control means (not disclosed) as a function of the engine operating conditions. When the solenoid valve 15 is opened, the oil pressure within the chamber 6 is discharged, hence the valve 1 closes quickly under the effect of the return spring 4. When the solenoid valve 15 is closed, the oil within the chamber 6 transmits the movements of the piston 7 to the piston 5 and consequently to the valve 1, hence the position of the valve 1 is determined by the cam 9. In other words, the cam 9 normally controls the opening of the valve 1 according to a cycle that depends on the profile of the cam, but it can be "disabled" whenever required, opening the solenoid valve 15, hence interrupting the connection between the piston 7 and the valve 1.

Hence, as disclosed above, by controlling the above-mentioned solenoid valve, which acts in order to adjust the opening time and stroke of the respective intake valve, it is possible for each cylinder to control the quantity of air aspirated so that this is variable according to the required operating conditions for the cylinder and independently from the operating conditions of the other cylinders.

The internal combustion engine according to the present invention is, also, provided with injector means (not shown) for each cylinder, which are adapted to carry out the injection of a certain amount of fuel within the combustion chamber of the cylinder itself. Such injector means can be of any type commonly used in the technical field inherent here.

Electronic means are also provided for carrying out the above control of the solenoid valve, and, furthermore, for controlling the injector means in order to adjust the duration of fuel injection carried out within the combustion chamber of the cylinder and to adjust, therefore, the quantity of fuel introduced therein.

When the engine is subject to an operating variation request from a first operating condition to a second operating condition, the electronic control means are adapted to select the cylinder to which said second operating condition is to be assigned based on a programming delay. The programming delay of a determined operating condition corresponds to the advance time with respect to the moment to which the cylinder is to be programmed, so that, in correspondence with that moment, such an operating condition is actuated in such a cylinder. Consequently, when the engine is subject to an operating variation request, the electronic control means assign, for the first time after said request, the new operating condition to the cylinder that, after the programming delay associated with such new condition, is susceptible for being the first to actuate it.

According to the present invention, the programming delay is defined only as a function of the engine speed.

This means that in correspondence with a particular engine speed, the programming delay associated with it is always the same regardless of the new conditions requested, and therefore regardless of the new quantities of fuel and air, of the new injection and intake strokes and of the new ignition advance value.

Such a programming delay is stored in the electronic control means during the system set-up and, therefore, is immediately available.

Its value for a particular engine speed is chosen as the necessary time, expressed using the number of strokes, so that after its programming the combustion process is carried out, the latter requiring, amongst all the possible operating conditions that can be applied in the cylinders at such given speed, the highest time to trigger. Hence, as disclosed above, the programming delay is chosen in such a way that all the combustion processes, that can be actuated at such given speed, can be carried out, after being programmed, within such predetermined programming delay.

From a theoretical point of view, the programming delay should be calculated, as disclosed below, for all the speed values at which the engine can operate, but, in practice it is sufficient to refer to a series of values conveniently spaced out between each other covering the entire range of the possible engine speeds and the programming delay for the values not considered is derived from those of such series by means of suitable approximations. Preferably, the values of such series are chosen in such a way that each one does not differ by more than one defined rpm value (for example 50) from those immediately adjacent to the same series.

Now the method for calculating the programming delay will be disclosed.

For each speed value, the actuation delays of the injector means, the solenoid valve and the ignition means are calculated in the implementation of all the combustion processes that can be actuated by the engine at such a speed.

Such actuation delays correspond to the time passing between the request of a particular actuation (of the injector means, the solenoid valve, or the ignition means) and the ignition trigger. The actuation delays are expressed in terms of number of engine strokes whereby in the end they represent the number of strokes between the top dead centre (TDC) wherein the actuation request is carried out and the TDC wherein the combustion process originating from such actuation is carried out.

Out of the estimated actuation delays for the injector means, solenoid valve and ignition means those which have the highest respective actuation delays for each speed value considered are stored in the electronic control unit.

Figure 1:
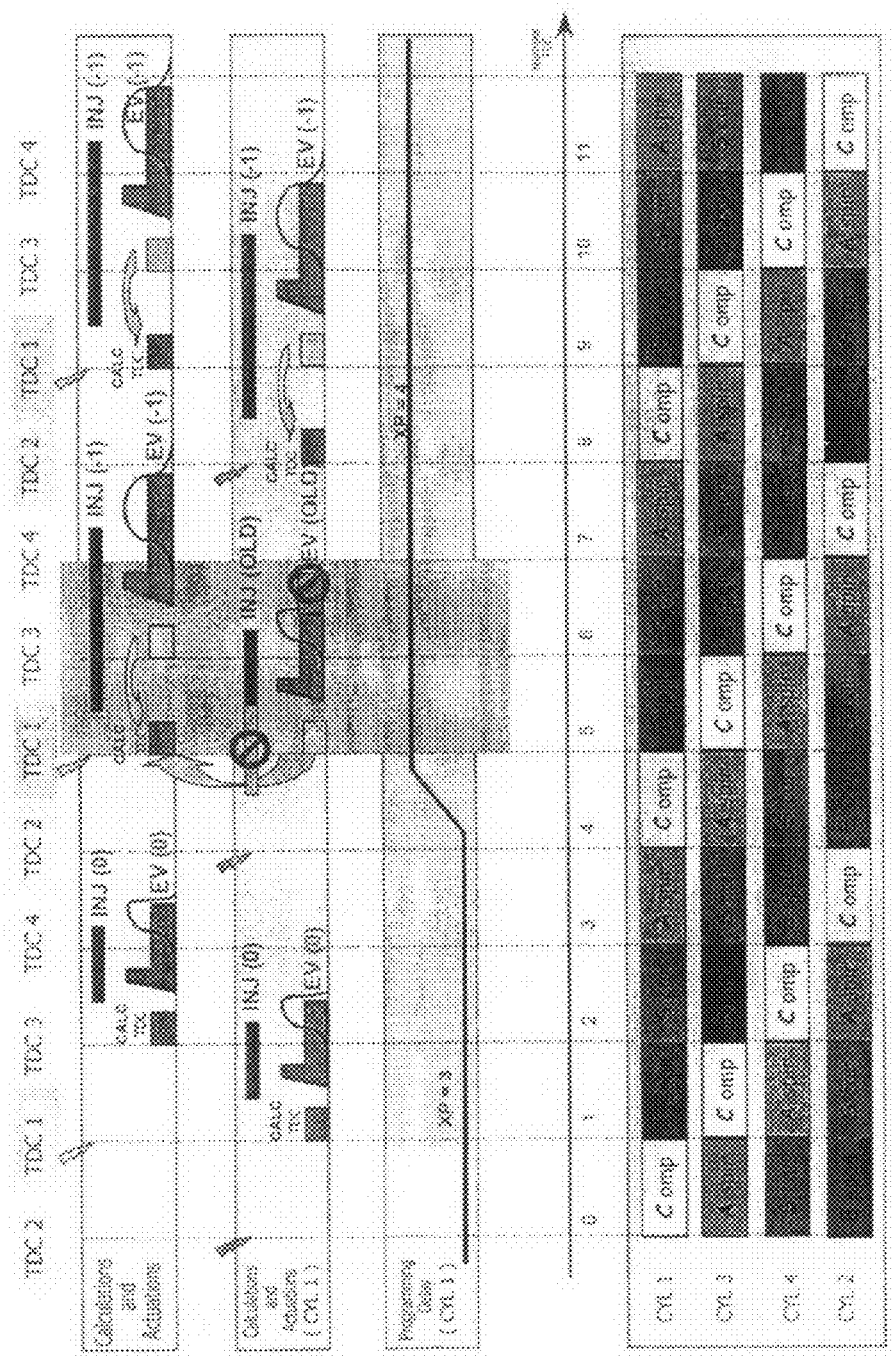
FIG. 1 represents an operating diagram of an internal combustion engine according to European patent application no. 07425773.4 of the same Applicant, in the presence of a (load or speed transient) variation of the engine conditions.
Figure 2:
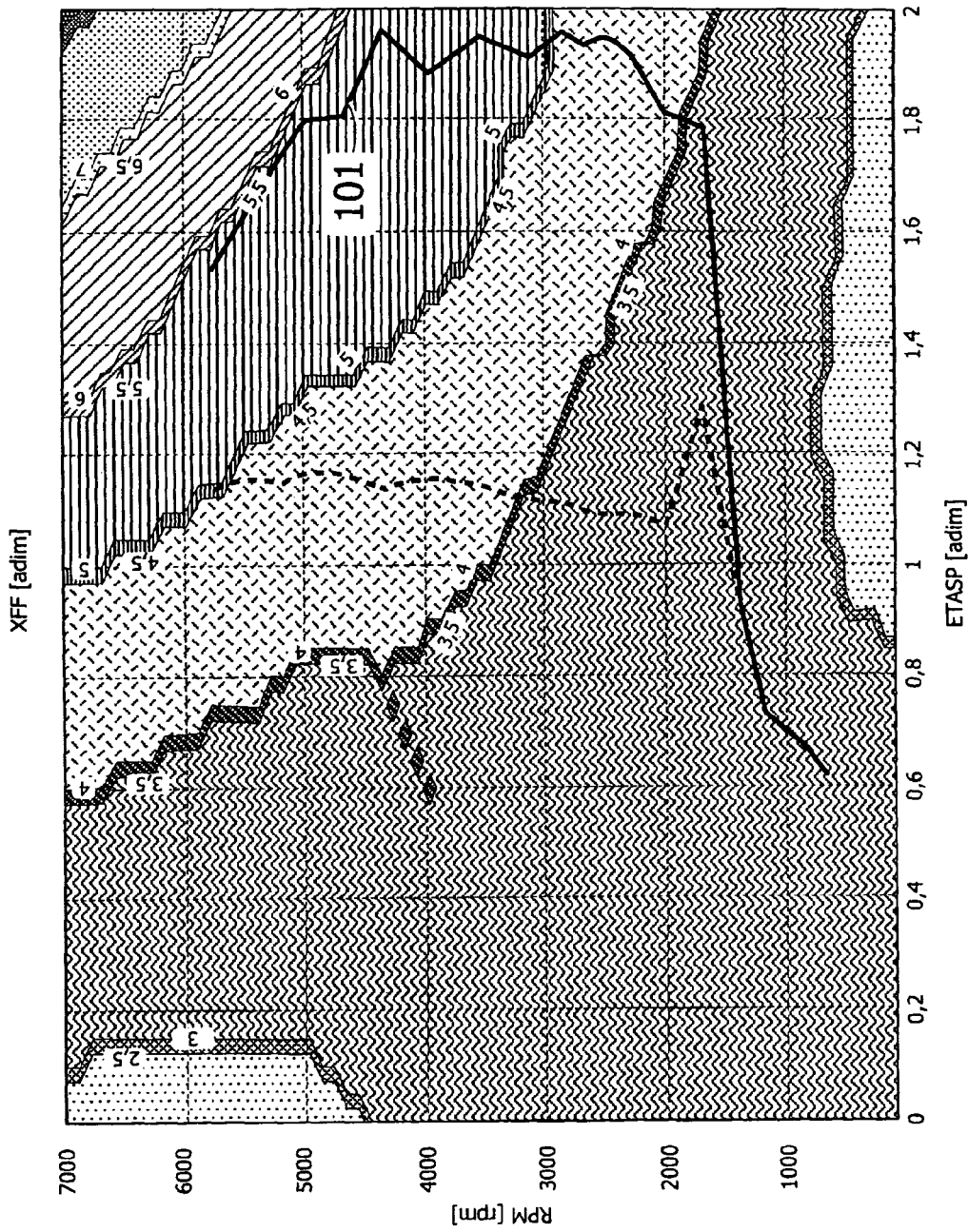
FIG. 2 represents a diagram of the injector actuation delays as a function of the loads and number of engine revolutions per minute, for the predetermined engine operating modes of the diagrams in FIGS. 2A and 2B.

FIG. 2 represents a diagram of the actuation delays of the injector means as a function of engine loads and speeds, for a supercharged internal combustion engine with four cylinders. Such a diagram allows the highest actuation delays of the injector means as a function of engine speed to be identified.

The engine speeds are shown on the ordinate axis of such a diagram (expressed in number of revolutions per minute) and the actuation delay of the injector means is shown on the graph (expressed in number of engine strokes). The engine loads are shown on the abscissa axis (expressed in ETASP, that is an indicative value of the air aspirated into the cylinders). The diagram in FIG. 2 illustrates a curve 101 that represents the curve of the maximum loads at which the engine can operate. Curve 101, therefore, represents the border of the engine working area, said area extending to the left of curve 101 (with reference to FIG. 2).

Figure 2A:
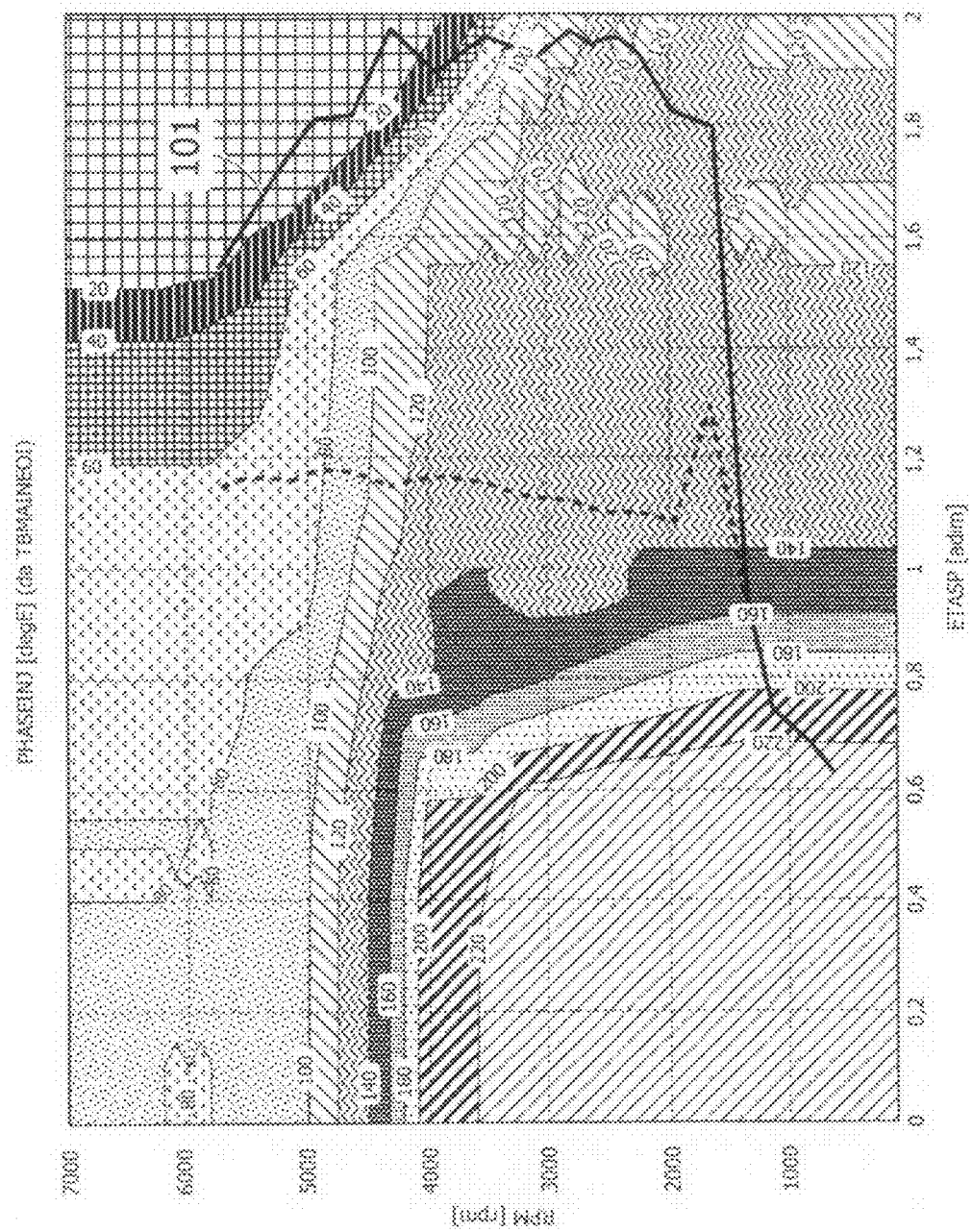
FIGS. 2A and 2B represent diagrams respectively of the injection phase and of the injection duration, as a function of the loads and number of engine revolutions per minute, corresponding to predetermined engine operating modes.
Figure 2B:
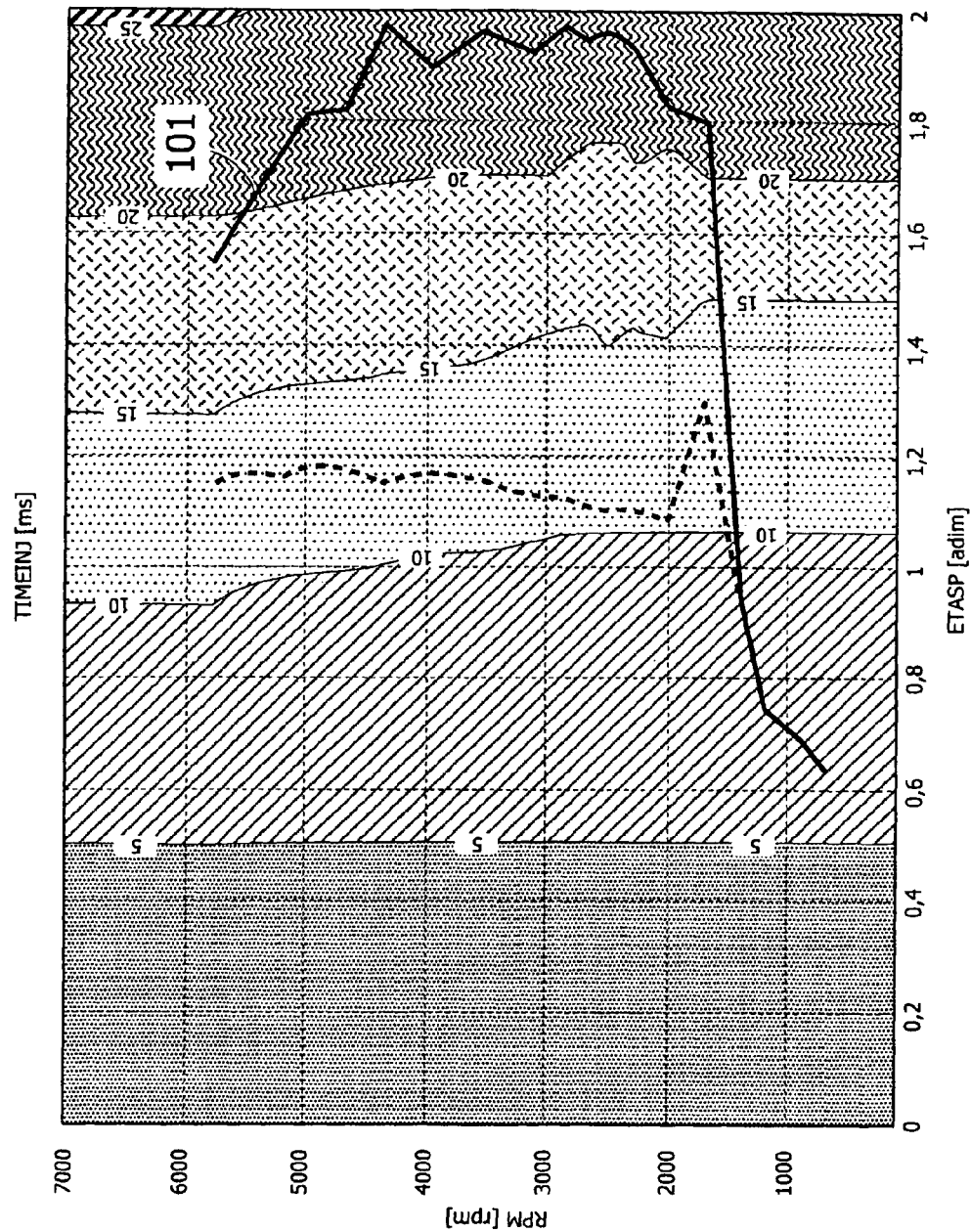

The diagram in FIG. 2 originates from the combination of the information expressed in the diagrams in FIGS. 2A and 2B representing respectively the trend of the injection phase and the duration of the injection, as a function of the engine loads and speed. The regions defined in such diagrams represent constant value regions, respectively of the injection phase and duration. The number indicated on each of such regions represents the value of the injection phase and of its duration corresponding to such a region. The injection phases and durations in the diagrams in FIGS. 2A and 2B correspond to the injection phases and durations which, by means of experimental evaluations, have been considered suitable to generate the best combustion processes at the corresponding engine loads and number of revolutions per minute.

The trend of the actuation delay of the injector means as a function of engine loads and revolutions per minute (shown in FIG. 2) originates from the diagrams in FIGS. 2A and 2B, since such delay, in fact, depends both on how much time before the ignition the injection has to start (and therefore on the injection phase), and on the duration of the injection itself.

The various regions defined in the diagram in FIG. 2 represent the regions with constant actuation delay of the injector means. The numbers indicated respectively represent the value of the actuation delay of each region.

In order to evaluate the maximum actuation delay of the injector means as a function of the speed, it is necessary to consider for each speed value the region of maximum actuation delay to which it corresponds. For example, at a speed of 3000 rpm, the region of maximum delay is the region with a delay equal to five engine strokes.

Figure 3:
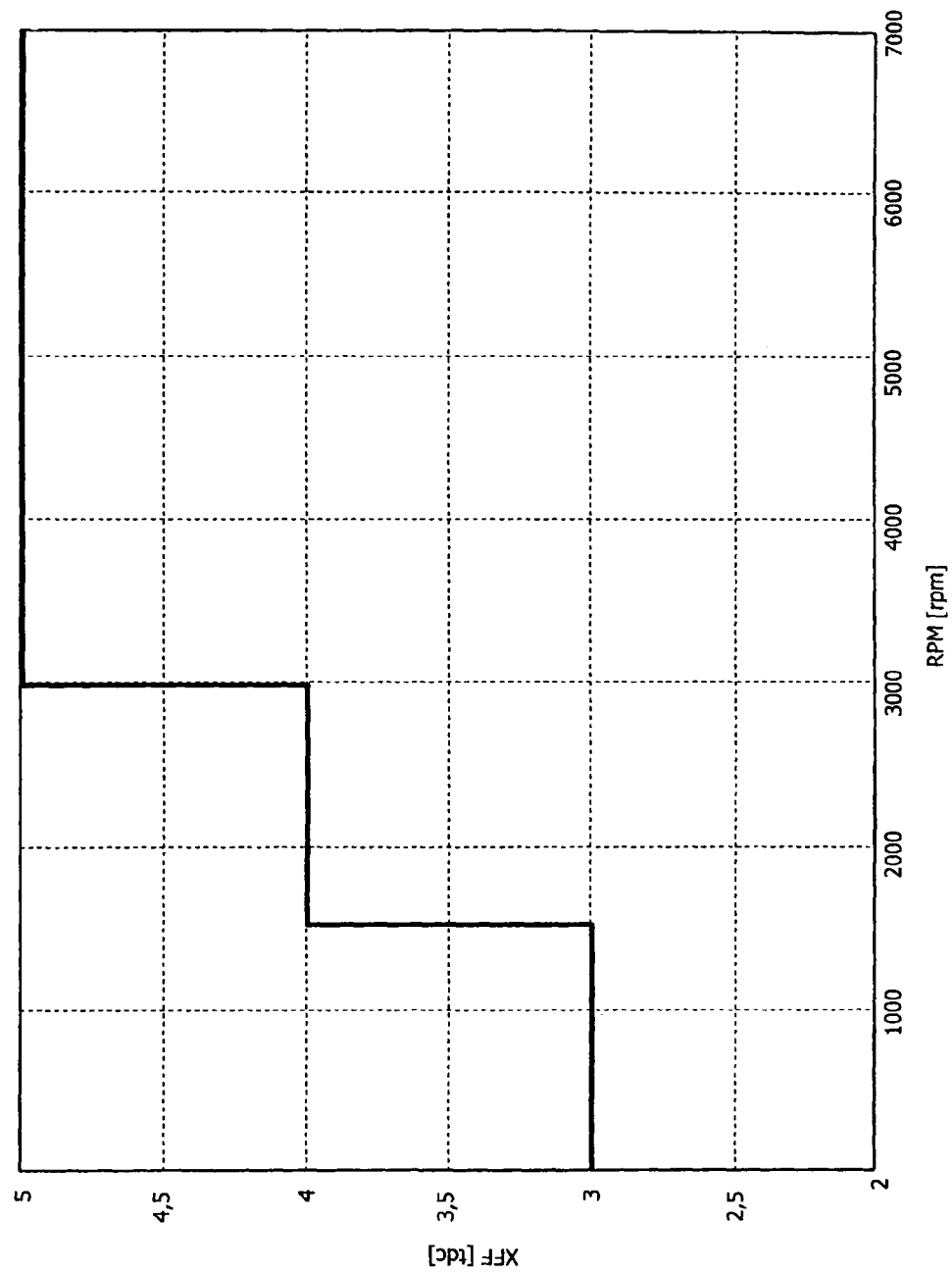
FIG. 3 represents a diagram of the highest values of the actuation delays of FIG. 2, as a function of the number of engine revolutions per minute.

FIG. 3 represents the curve resulting from the procedure indicated above of the maximum actuation delay of the injector means as a function of the engine speed. As is clear in said figure, such a curve defines a histogram indicating a determined value of the actuation delay of the injector means as a function of the engine revolutions per minute.

The above-described procedure is also used to obtain the maximum actuation delay curves, as a function of the engine speed, the solenoid valve and the ignition means still based on diagrams similar to that in FIG. 2.

The maximum actuation delays are finally stored in the electronic control unit, the latter providing to evaluate the programming delay evaluating it as the highest of the identified actuation delays.

Should the actuation delays in FIG. 3 be, for all the speeds at which the engine can operate, greater than the maximum actuation delays of the solenoid valve and the ignition means, the graph in FIG. 3 would represent the programming delay of the cylinders as a function of the engine speed. In that case, the programming delay values deducible from such a graph would be uploaded onto the electronic control unit associating them with the corresponding engine speed values.

Therefore, the great simplification brought about by the innovative approach applied by the Applicant to the control strategies under discussion is clear.

In fact, each time a new operating condition is requested of the engine, the control means check the programming delay corresponding to the engine speed at which it is operating at that moment and based on such a programming delay they immediately determine to which cylinder to assign the new operating condition requested.

For the reasons discussed above, based on the programming delay considered, it is certain that the cylinder to which the new operating condition is assigned is able to actuate it, regardless of the new load required. This means that the cylinders always operate with excellent combustion processes.

The advantage obtained with respect to the solution, previously described, of the European patent by the same Applicant consists, as previously mentioned, in that the control strategy is determined a pylori during the system set-up phase, so as to prevent the control means having to carry out complicated processing in real-time that is difficult to handle.

Figure 4:
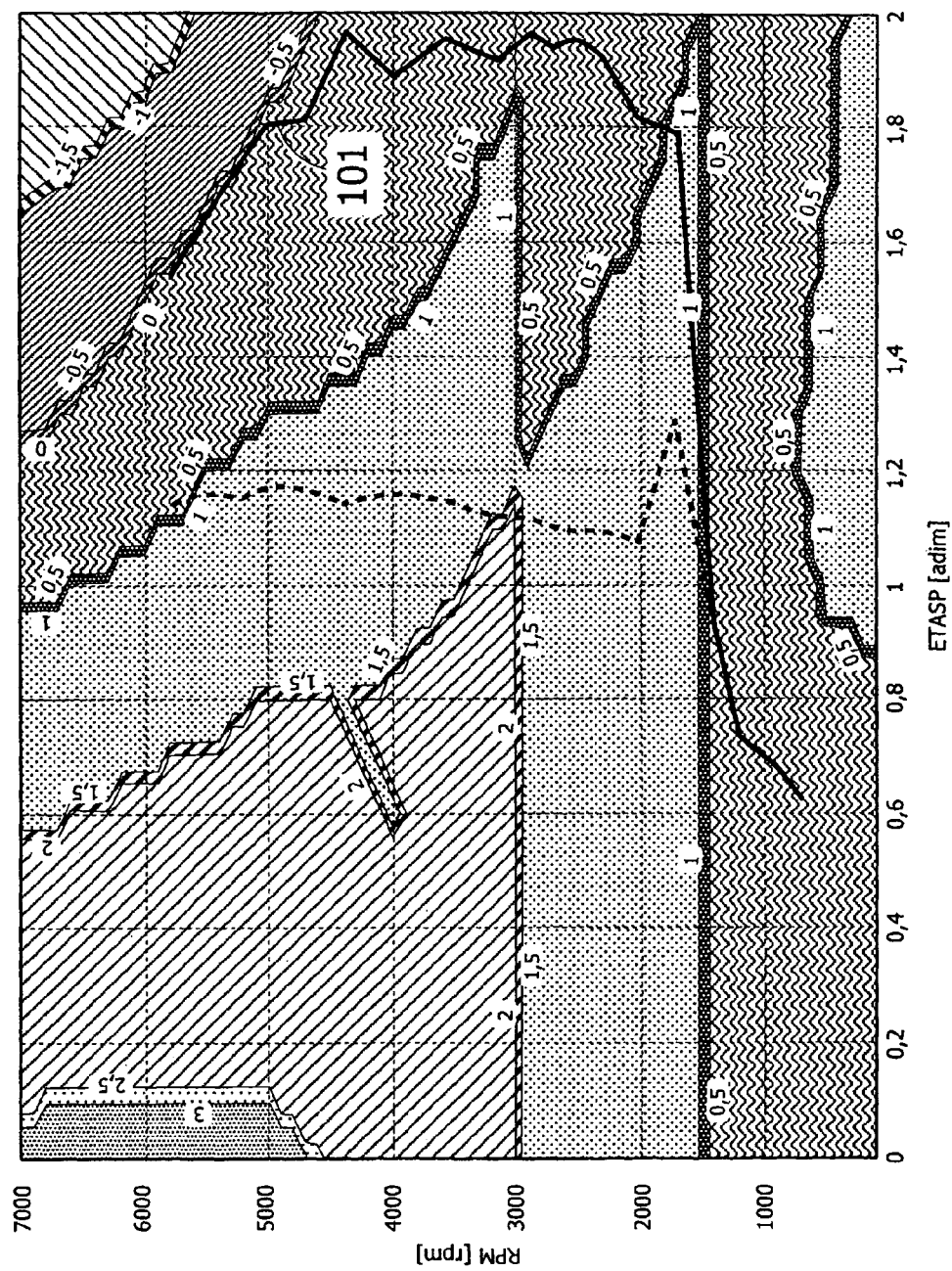
FIG. 4 represents the numerical difference between the programming delays calculated according to the control strategy of European patent application no. 07425773.4 and those calculated according to the control strategy described herein, for the predetermined engine operating modes of the diagrams in FIGS. 2A and 2B.

It should be noted that, with respect to such previous solution, the above-described control strategy allows an equally rapid response of the engine in the transients of operation, despite the chosen artifice and the approximations used. FIG. 4 represents the numerical difference between the programming delays calculated with the control strategy of patent application no. 07425773.4 and those calculated with the control strategy described herein, for the engine operating modes considered in FIGS. 2 and 3. Curve 101 still represents the engine maximum load curve.

From such figure it can be understood that for the regions respectively with high load and high revolutions and with low load and low revolutions, wherein it is important to guarantee an immediate response of the engine following an operating variation request, the programming delays calculated according to the control strategy described herein are substantially equal to the programming delays calculated with the method of the previous patent application.

The Applicant has finally verified that the actuation delay values of the injector means, ignition means, and solenoid valve vary according to the engine's external environmental conditions (such as atmospheric pressure, air, water and oil temperature, etc.)

The storage of the three maximum actuation delays in the electronic control unit is therefore particularly desirable since it allows, by means of experimental reports, the values of the three actuation delays stored to be adjusted, based on the external conditions detected and to check, following the new external conditions, which of the three actuation delays is the greater and therefore the new programming delay.

In this way, it is always certain that the programming delay evaluated corresponds to the slowest operating condition to be carried out in the cylinders.

Naturally, various modifications to the construction details and the embodiments can be possible, within the spirit of the invention according to that described and disclosed merely by way of example, without departing from the scope of the present invention.

What is claimed is:

1. A multi-cylinder internal combustion engine comprising:
    an air delivery pipe adapted to convey air to each engine cylinder,
    at least one intake valve for each cylinder that controls the communication between said pipe and the combustion chamber of the respective cylinder,
    wherein each intake valve is controlled by actuator means for feeding a determined quantity of air into said combustion chamber, said actuator means being adapted to control the respective intake valve independently from the other cylinders and according to variable actuation modes,
    injector means for each cylinder adapted to carry out the injection of a determined quantity of fuel into said combustion chamber,
    electronic control means of the operating conditions of the cylinders adapted to control:
        said actuator means, for adjusting the opening time and stroke of the respective intake valve,
        said injector means, for adjusting said determined quantity of fuel,
    wherein, when the engine is subject to an operating variation request from a first operating condition to a second operating condition, said electronic control means are adapted to select the cylinder to which said second operating condition is to be assigned based on a programming delay,
        wherein said electronic control means are arranged in order to assign a programming delay as a function of the engine speed only so that in correspondence with an engine speed, the programming delay is associated that is the same regardless of fuel and air quantities and of injection and air-intake timings of the second condition.

2. An engine according to claim 1, wherein the programming delay assigned to said electronic control means for a determined engine speed corresponds to the greatest of the actuation times of said injector means and said actuator means, necessary in the possible different operating conditions of the engine at said given speed.

3. An engine according to claim 1, wherein said electronic control means have stored the information corresponding to said programming delay, for each speed at which the engine can operate.

4. An engine according to claim 3, wherein said programming delay is evaluated as the number of engine strokes.

5. An engine according to claim 1, wherein it comprises:
    return spring means which push the valve towards a closed position, to control the communication between the respective suction pipe and the combustion chamber of the respective cylinder,
    at least one camshaft to drive each intake valve of the cylinders of the engine through respective valve lifters each intake valve being controlled by a respective cam of said camshaft,
    wherein each of said valve lifters controls the respective intake valve against the action of said return spring means through the interposition of hydraulic means including a pressure fluid chamber,
    the pressure fluid chamber associated with each intake valve being adapted to be connected using a solenoid valve to a venting channel in order to uncouple the valve from the respective valve lifter and causing the rapid closure of the valve due to the effect of the respective return spring means.

6. A control method of an internal combustion engine of a type comprising:
    an air delivery pipe adapted to convey air to each engine cylinder,
    at least one intake valve for each cylinder that controls the communication between said pipe and the combustion chamber of the respective cylinder,
    wherein each intake valve is controlled by actuator means for feeding a determined quantity of air into said combustion chamber, said actuator means being adapted to control the respective intake valve independently from the other cylinders and according to variable actuation modes,
    injector means for each cylinder adapted to carry out the injection of a determined quantity of fuel into said combustion chamber,
    electronic control means of the operating conditions of the cylinders adapted to control:
        said actuator means, for adjusting the opening time and stroke of the respective intake valve,
        said injector means, for adjusting said determined quantity of fuel,
    wherein, when the engine is subject to an operating variation request from a first operating condition to a second operating condition, said electronic control means are adapted to select the cylinder to which said second operating condition is to be assigned based on a programming delay,
        wherein said programming delay is determined only as a function of the engine speed so that in correspondence with an engine speed, the programming delay is associated that is the same regardless of fuel and air quantities and of injection and air-intake timings of the second condition.

7. A method according to claim 6, wherein said programming delay is calculated, for a determined engine speed, as the greatest of the actuation times of said injector means and said actuator means, necessary in the possible different operating conditions of the engine at said given speed.

* * * * *